United States Patent Office 2,713,574
Patented July 19, 1955

2,713,574

NEW SYNTHESES OF PEPTIDES AND SUBSTITUTED AMIDES

James R. Vaughan, Jr., Darien, Conn., assignor to American Cyanamid Company, New York, N. Y., a corporation of Maine No Drawing. Application May 24, 1951,
Serial No. 228,125

17 Claims. (Cl. 260—112)

This invention relates to a new method of organic syntheses and more particularly to a new method of preparing substituted amides and peptides.

In recent years considerable interest has developed in new methods of preparing amides and particularly peptides. This is because of a serious need for such methods in protein chemistry and especially in the study of virus and enzymes. Since many of the peptides prepared in connection with such work are labile compounds subject to decomposition or racemization by even moderate temperatures, it is imperative that methods be employed in their syntheses which are operative through the entire syntheses at very low temperatures. Often, even moderate temperatures cannot even be employed to remove the by-products formed by the reaction and this has caused considerable difficulty in prior art of peptide syntheses. The new method of this invention overcomes the above difficulties and furnishes a very low temperature method of preparing peptides of high purity in exceptionally good yields.

According to the procedure of this invention a mixed anhydride of an N-acylated aminoacid with an alkyl carbonic acid, hereinafter, in some instances, referred to as an acylalkyl carbonate, is reacted with an amine having amine hydrogen. The new method may be more clearly illustrated by the following general equation:

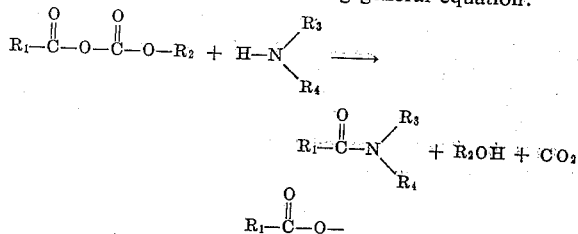

represents a radical derived from an aminoacid having the amino group or groups blocked by acylation, $R_2$ represents an alkyl, aralkyl, or cycloalkyl radical, $R_3$ represents hydrogen or an organic radical capable of being attached to an amino group by a carbon to nitrogen linkage, and $R_4$ represents a radical capable of being attached to an amino group by a carbon to nitrogen linkage.

As will be noticed from the above equation the by-products are carbon dioxide, which comes off as a gas, and an alcohol. Since alcohols are generally soluble in water, this by-product may be removed simply by washing the reaction product with water. This is in contrast to prior art procedures in which the principal by-products were generally complex degradation products of the reactants used and could only be removed from the substituted amide with difficulty. Thus it may be seen that by the method of this invention a pure product can be obtained with a minimum of difficulty. In fact, in the new process of this invention the desired amide or peptide usually can be crystallized from the reaction mixture in almost pure form and after washing with water to remove the alcohol by-product, it is so pure that recrystallization is unnecessary.

In addition to the above, the new process has many other advantages. First, the reaction is performed at such low temperatures that difficulty from decomposition or racemization is rarely encountered. In fact, a complete syntheses of a peptide, including the purification, can be performed, if desired, at temperatures below 0° C. An additional advantage is the high yields obtained. Yields in excess of 60% of theoretical are not unusual.

As stated above, the radical represented by

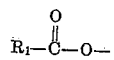

is a group derived from an aminoacid. More specifically $R_1$ represents an organic radical attached to the carbonyl group by a carbon to carbon linkage and having an acidamido substituent, preferably in the alpha or beta position. For instance, when the group

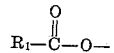

is derived from an alpha aminoacid, the acylalkylcarbonate may be represented by the following formula:

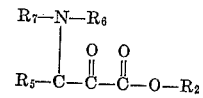

in which $R_2$ is as defined above, $R_5$ is hydrogen or an organic radical attached by a carbon to carbon linkage, $R_6$ is hydrogen or an organic radical attached to the amino group by a carbon to nitrogen linkage, and $R_7$ is an acyl group. In many instances the acyl group may also conveniently be derived from an aminoacid or a peptide in which case the process of this invention will result in the formation of a higher peptide derivative.

The acylalkylcarbonates employed in the process of this invention may be prepared by reacting an aminoacid, having the amino group or groups blocked by acylation, with an alkylchlorocarbonate as may be illustrated by the following equation:

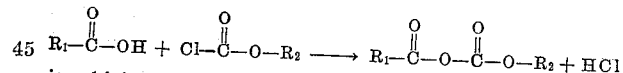

in which $R_1$ and $R_2$ are as defined above. The reaction should be performed at a temperature below about 5° C. and may be conveniently performed in an inert solvent which does not freeze at the reaction temperature. As hydrochloric acid is formed by the reaction, it is generally advisable to add a hydrochloric acid acceptor, such as a tertiary amine, to the reaction mixture. Acylalkylcarbonates of the above formula employed in the process of this invention are believed to be new compounds although similar compounds, prepared from acids other than aminoacids, have been previously reported (see, for instance, German Patent No. 117,267). More detailed instructions for preparing this new group of compounds are given in the examples to follow.

Practically any primary or secondary amine having amine hydrogen is suitable for use in the new process of this invention and the particular amine employed depends upon the substituted amide desired. Amines which may suitably be employed in the new process may be illustrated by the following: primary aliphatic amines, for instance methylamine, ethylamine, propylamine, butylamine, hexylamine and allylamine; secondary aliphatic amines, for instance dimethylamine and dibutylamine; substituted aliphatic amines, for instance chloroethylamine, phenethylamine and benzylamine; aromatic amines, for instance aniline and naphthylamine; substituted aromatic amines, for instance m-toluidine and p-benzylaniline; secondary mixed aliphatic-aromatic amines, for instance N-allylaniline, and benzylaniline; cyclic amines, for instance piperidine, and morpholine; heterocyclic amines, for instance aminopyrimidine; diamines, for instance butylenediamine and ethylenediamine.

Many other amines are equally suitable for use in the new method of this invention, the main requirement being that the compound have a free amino group having amine hydrogen. In many compounds which might ordinarily be considered to have a free amino group, this group is in reality neutralized by salt formation. This is the case with aminoacids. Therefore, if an aminoacid is to furnish the amino group for the above reaction, it should be employed in a basic solution so that a free amino group is actually available. It should also be mentioned that secondary amines which are substituted with two highly negative aromatic groups, for instance diphenylamine, usually cause difficulty in any method of preparing amides from amines and likewise may not be satisfactorily employed in the new process of this invention. Such amines may be characterized by their low dissociation constant as they have in water at 25° C. a dissociation constant of less than $1 \times 10^{-13}$.

Basic salts of aminoacids, as well as aminoacid esters and amides may advantageously be employed in the new process of this invention for the preparation of peptides and polypeptides. In fact, it is in the preparation of peptides and polypeptides that the new process has its greatest utility. Aminoacids, the basic salts, esters and amides of which can be employed, may be illustrated by the following: alanine, valine, norvaline, leucine, norleucine, isoleucine, isovaline, phenylalanine, tyrosine, serine, cysteine, methionine, aspartic acid, glutamic acid, lysine, ornithine, asparagine, histidine, tryptophane, proline and hydroxyproline. Many of the above aminoacids have sensitive groups and in addition often exist in optically active forms. These qualities made them unsuitable for satisfactory use in many of the prior art methods of preparing amides.

From the above discussion it will be seen that there are several procedures within the scope of this invention by means of which it is possible to prepare long chain polypeptides. The polypeptides may be built one molecule at a time by reacting a basic salt of an aminoacid with the acylalkylcarbonate, forming an acylalkylcarbonate from the reaction product and reacting this with more aminoacid salt and so on. Polypeptides may also be built several molecules at a time by preparing an acylalkylcarbonate from a peptide derivative and reacting this with a free amino group of another peptide. By either procedure, excellent results are obtained.

The following table lists the results of tests in which carbobenzoxyglycylanilide was prepared by reacting analine with different acylalkylcarbonates represented by the formula:

in which R represents the various radicals listed in table. The yields are given in percent of theoretical.

TABLE

| "R" | Yield, percent |
| --- | --- |
| Secondary butyl | 70 |
| Ethyl | 56 |
| Isopropyl | 49 |
| Isobutyl | 68 |
| 2-Ethylbutyl | 55 |
| 1-Ethylamyl | 67 |
| 1,3-dimethylbutyl | 64 |
| 1-Isobutyl-3-methylbutyl | 65 |
| Cyclohexyl | 53 |
| 3,3,5-trimethylcyclohexyl | 61 |
| Benzyl | 44 |

The material obtained from each of the above tests was of exceptional purity and had a melting point of about 146–148° C. after simply washing with water and drying. It is indeed exceptional when such high purity material can be obtained without recrystallization.

It will also be seen from the above table that higher yields are generally obtained when the acylalkylcarbonate is one such as is formed from an aliphatic branched chain alkylchlorocarbonate. While the exact reasons for this are not fully understood, it is believed to be due to the steric hindrance of the branched chain group in the acylalkylcarbonate molecule. Higher yields are also obtained from such acylalkylcarbonates in preparing other amides and peptides and for this reason their use comprises a preferred procedure.

The new reaction of this invention may be advantageously performed in an inert solvent and preferably in an aromatic hydrocarbon solvent such as toluene or xylene. In most instances the acylalkylcarbonate will also be prepared in an inert solvent and in such cases the acylalkylcarbonate need not be isolated since the solvent used in preparing the acylalkylcarbonate can also serve as the solvent for the process of this invention. In addition to the aromatic hydrocarbons, there are many other suitable inert solvents as may be illustrated by the following: chlorinated hydrocarbons, for instance chloroform, carbon tetrachloride and chlorobenzene; aliphatic ethers, for instance ethyl ether; cyclic ethers, for instance dioxane; aliphatic ketones, for instance dibutyl ketone and aliphatic esters, for instance ethyl acetate. When the acylalkylcarbonate is to be reacted with a basic salt of an aminoacid, it is sometimes advantageous to add an organic solution of the acylalkylcarbonate to an aqueous solution of the aminoacid salt.

It is one of the advantages of the new process that it may be carried out at low temperatures. In fact temperatures above 5° C. should not be employed as the acylalkylcarbonates are usually unstable above such temperatures. Lower temperatures, for instance minus 40° C., may be used as long as a solvent is employed which does not freeze at such temperatures. As a general rule, however, temperatures between minus 10° C. and 0° C. are preferred. The reaction is substantially complete in only a short time, i. e., 5 minutes to 2 hours, as is evidenced by a cessation of carbon dioxide evolution; however, since a prolonged reaction period is not detrimental, a longer time, for instance 6 to 12 hours, is sometimes allowed.

The new process will be more fully illustrated by means the following specific examples in which all parts are by weight unless otherwise indicated.

*Example 1*

A solution of 5.23 parts by weight of carbobenzoxyglycine and 2.55 parts by weight of triethylamine in 50 parts by volume of toluene is cooled to minus 10° C. and a solution of 4.26 parts by weight of benzylchlorocarbonate in 25 parts by volume of toluene is added dropwise with stirring. As the acylalkylcarbonate forms, the reaction mixture becomes an almost solid white mass.

After allowing the acylalkylcarbonate to sit for 30 minutes at minus 10° C., 2.34 parts by weight of aniline are added with stirring. Carbon dioxide is evolved and after a few minutes the reaction mixture is allowed to warm to room temperature. The reaction mixture is then allowed to sit overnight at room temperature to assure complete crystallization of the carbobenzoxyglycylanilide. The colorless solid is then removed by filtration, washed with dilute hydrochloric acid, dilute sodium hydroxide and water and dried in a vacuum at 60° C. to give almost chemically pure carbobenzoxyglycylanilide.

In place of the benzylchlorocarbonate of the above example one can substitute equal molar quantities of other chlorocarbonates such as secondary-butylchlorocarbonate, ethylchlorocarbonate, isopropylchlorocarbonate, isobutylchlorocarbonate, 2-ethylbutylchlorocarbonate, 1-ethylamylchlorocarbonate, 1,3-dimethylbutylchlorocarbonate, 1-isobutyl-3-ethylbutylchlorocarbonate, cyclohexylchlorocarbonate, and 3,3,5-trimethylcyclohexylchlorocarbonate with satisfactory results. In fact, the results obtained when such substitutions were made are given in the table above.

*Example II*

Example I is repeated except that a temperature of minus 20° C. to minus 40° C. is employed. The yield of carbobenzoxyglycylanilide is substantially the same.

*Example III*

Example I is repeated except that a benzene solvent and a temperature of about 5° C. are employed. The yield of carbobenzoxyglycylanilide is reduced indicating that lower temperatures are preferred.

*Example IV*

A solution of 4.18 parts by weight of carbobenzoxyglycine and 2.04 parts by weight of triethylamine in 50 parts by volume of toluene is cooled to minus 5° C. and 2.73 parts by weight of secondary-butylchlorocarbonate is added with shaking. A colorless precipitate of triethylamine hydrochloride slowly separates. A period of 25 minutes is allowed for the formation of the acylalkylcarbonate.

To the above solution of the acylalkylcarbonate there is added dropwise with stirring 3.8 parts by weight of ethyl DL-phenylalanate. Carbon dioxide is liberated immediately upon the addition of the amino-acid ester and after about 5 minutes the reaction mixture is allowed to warm to room temperature. After standing overnight the insoluble triethylamine hydrochloride is removed by filtration and the filtrate washed with 100 parts by volume of 3% sodium bicarbonate. On cooling the washed solution in an ice bath, the ethyl carbobenzoxyglycyl-DL-phenylalanate separates rapidly as colorless crystals and is removed by filtration. A second crop of crystals can be obtained by dilution of the mother liquor with petroleum ether.

*Example V*

A solution of 4.18 parts by weight of carbobenzoxyglycine and 2.04 parts by weight of triethylamine in 50 parts by volume of toluene is cooled to minus 5° C. and 2.73 parts by weight of iso-butylchlorocarbonate added. The solution is then maintained at this temperature for 25 minutes longer to allow for the formation of the acylalkylcarbonate.

A solution of ethyl L-tyrosinate is prepared from 4.91 parts by weight of ethyl L-tyrosinate hydrochloride and 2.04 parts by weight of triethylamine in 50 parts by volume of chloroform. This solution is cooled to minus 5° C. and added slowly with stirring to the solution of the acylalkylcarbonate. Carbon dioxide is evolved immediately and after a few minutes the solution is allowed to warm to room temperature. After standing overnight the mixture is washed with water and with 100 parts by volume of 3% sodium bicarbonate. The ethyl carbobenzoxyglycyl-L-tyrosinate separates from the washed toluene-chloroform solution almost immediately as colorless crystals.

*Example VI*

A solution of 5.30 parts by weight of carbobenzoxy-L-leucine and 2.04 parts by weight of triethylamine in a mixture of 25 parts by volume of toluene and 25 parts by volume of chloroform is cooled to minus 5° C. and 2.73 parts by weight of secondary-butylchlorocarbonate added. The solution is maintained at this temperature for an additional 25 minutes to allow for the formation of the acylalkylcarbonate.

To the solution of the acylalkylcarbonate there is added slowly with stirring a precooled solution prepared from 2.79 parts by weight of ethylglycinate hydrochloride and 2.04 parts by weight of triethylamine in 50 parts by volume of chloroform. Carbon dioxide is evolved immediately and after a few minutes the solution is allowed to warm to room temperature. After standing overnight the reaction mixture is washed with water to remove triethylamine hydrochloride, followed by washing with 100 parts by volume of 3% sodium bicarbonate solution. The organic phase is separated and dried over anhydrous sodium sulfate. Upon dilution of the dried solution with 200 parts by volume of petroleum ether and cooling, the ethyl carbobenzoxy-L-leucylglycinate crystallizes slowly as colorless plates. An additional crop of crystals can be obtained by concentration of the mother liquor.

*Example VII*

Ethyl carbobenzoxy-L-phenylalanyl-L-tyrosinate is prepared by the procedure of Example VI by substituting 5.99 parts by weight of carbobenzoxy-L-phenylalanine for the carbobenzoxy-L-leucine and 4.90 parts by weight of ethyl-L-tyrosinate hydrochloride for the ethyl glycinate hydrochloride of that example. The ethyl carbobenzoxy - L - phenylalanyl - L - tyrosinate separates as a gelatinous solid and is purified by recrystallization from aqueous alcohol.

*Example VIII*

A solution of the acylalkylcarbonate from carbobenzoxy-L-leucine and secondary-butylchlorocarbonate is prepared as in Example VI. To this solution there is added a second solution prepared from 2.04 parts by weight of triethylamine and 3.62 parts by weight of methyl leucinate hydrochloride in 50 parts by volume of chloroform precooled to 0° C. Carbon dioxide is evolved immediately and after a few minutes the reaction is allowed to warm to room temperature. After standing overnight the reaction mixture is washed with water, 3% sodium bicarbonate solution, dried over an anhydrous sodium sulfate and then concentrated to 25 parts by volume in a stream of air. On dilution with 200 parts by volume of petroleum ether the methyl carbobenzoxy-L-leucyl-L-leucinate slowly separates as colorless crystals.

*Example IX*

Colorless crystals of ethyl dicarbobenzoxy-L-lysylglycinate are prepared by the procedure of Example VI except there is substituted 8.29 parts by weight of dicarbobenzoxy-L-lysine for the carbobenzoxy-L-leucine of that example.

*Example X*

A solution of 7.13 parts by weight of carbobenzoxyglycyl-DL-phenylalanine and 2.04 parts by weight of triethylamine in 25 parts by volume of toluene and 25 parts by volume of chloroform is cooled to minus 5° C. and 2.73 parts by weight of iso-butylchlorocarbonate added. The solution is retained at this temperature for about 25 minutes to allow for the formation of the acylalkylcarbonate.

To the above solution of the acylalkylcarbonate there is added slowly with stirring a precooled solution prepared from 2.79 parts by weight of ethyl glycinate hydrochloride and 2.04 parts by weight of triethylamine in 50 parts by volume of chloroform. Carbon dioxide is evolved immediately and after a few minutes the reaction mixture is allowed to warm to room temperature. After standing overnight the mixture is washed with water to remove triethylamine hydrochloride and the remaining colorless needles of ethyl carbobenzoxyglycyl-DL-phenylalanylglycinate are isolated by filtration.

Example XI

Colorless crystals of ethyl phthalyl-DL-phenylalanylglycylglycinate are prepared by the procedure of Example VI but substituting 5.88 parts by weight of phthalyl-DL-phenylalanine for the carbobenzoxy-L-leucine and 3.93 parts by weight of ethyl glycylglycinate hydrochloride for the ethyl glycinate hydrochloride of that example.

Example XII

Colorless needles of ethyl carbobenzoxyglycyl-DL-phenylalanylglycylglycinate are prepared by the procedure of Example X but substituting 2.73 parts by weight of secondary-butylchlorocarbonate for the iso-butylchlorocarbonate and 3.93 parts by weight of ethyl glycylglycinate hydrochloride for the ethyl glycinate hydrochloride of that example.

Example XIII

A solution of 2.55 parts by weight of carbobenzoxyglycyl-DL-phenylalanate and 0.73 part by weight of triethylamine in 10 parts by volume of toluene and 10 parts by volume of chloroform is cooled to minus 5° C. and 0.98 part by weight of secondary-butylchlorocarbonate added. The solution is retained at minus 5° C. for about 25 minutes to allow for the formation of the acylalkylcarbonate.

To the above solution of the acylalkylcarbonate there is added slowly with stirring a solution of 2.2 parts by weight of ethyl DL-phenylalanylglycylglycinate in 20 parts by volume of chloroform precooled to 0° C. Carbon dioxide is evolved immediately and after a few minutes the reaction mixture is allowed to warm to room temperature. After sitting overnight, the reaction mixture is washed with water and filtered to obtain crystalline ethyl carbobenzoxyglycyl-DL-phenylalanyl-DL-phenylalanyl glycylglycinate. The organic phase is separated from the filtrate, washed with 3% sodium bicarbonate solution and dried over sodium sulfate. On the addition of petroleum ether to this solution a white oil separates and slowly solidifies. The solvent is decanted and the oil residue is boiled with a small amount of ethyl acetate to cause crystallization. This mixture is then diluted with petroleum ether and the colorless crystals removed by filtration. The second crop of crystalline ethyl carbobenzoxyglycyl-DL-phenylalanyl-DL-phenylalanylglycylglycinate is then purified by recrystallization from 1000 parts by volume of 50% aqueous alcohol.

The procedure of the above examples can be employed in preparing many other peptides. Examples of other peptides which have been prepared by this procedure include methyl carbobenzoxyglycyl-L-leucinate, ethyl carbobenzoxy-L-leucyl-L-tyrosinate, ethyl carbobenzoxyglycyl-L-phenylalanate, and ethyl carbobenzoxy-DL-alanyl-L-tyrosinate. These compounds were obtained in good yield and no racemization was observed.

I claim:

1. In a method of preparing amides wherein a compound having an amino group capable of being acylated is reacted with a mixed anhydride of an N-acylated aminoacid, the improvement which comprises employing a mixed anhydride of an alkyl carbonic acid.

2. In a method of preparing amides wherein a compound having an amino group capable of being acylated is reacted with a mixed anhydride of an N-acylated aminoacid, the improvement which comprises employing anhydrous conditions and a mixed anhydride of said N-acylated aminoacid with an alkyl carbonic acid wherein the alkyl group is a lower branched chain alkyl radical.

3. The improved method of claim 2 wherein the mixed anhydride is a mixed anhydride with secondary butyl carbonic acid.

4. The improved method of claim 2 wherein the mixed anhydride is a mixed anhydride with isobutyl carbonic acid.

5. The improved method of claim 2 wherein the mixed anhydride is a mixed anhydride with isoamyl carbonic acid.

6. The improved method of claim 2 wherein the mixed anhydride is a mixed anhydride with 1,3-dimethylbutyl carbonic acid.

7. The improved method of claim 2 wherein the mixed anhydride is a mixed anhydride with 1-isobutyl-3-methylbutyl carbonic acid.

8. In a method of preparing amides wherein an aminoacid ester is reacted with a mixed anhydride of an N-acylated aminoacid, the improvement which comprises employing anhydrous conditions and a mixed anhydride of said N-acylated aminoacid with an alkyl carbonic acid wherein the alkyl group is a lower branched chain alkyl radical.

9. The method of claim 8 wherein the mixed anhydride is a mixed anhydride with secondary butyl carbonic acid.

10. The method of claim 8 wherein the mixed anhydride is a mixed anhydride with isobutyl carbonic acid.

11. A method of preparing amides which comprises reacting together, under anhydrous conditions, a lower alkyl ester of an aminoacid having an amino group capable of being acylated and a mixed anhydride of an N-acylated peptide acid with an alkyl carbonic acid wherein the alkyl group is a lower branched chain alkyl radical.

12. The method of claim 11 wherein said mixed anhydride is a mixed anhydride with a butyl carbonic acid.

13. A method of preparing amides which comprises reacting together, under anhydrous conditions, a lower alkyl ester of a peptide acid having an amino group capable of being acylated and a mixed anhydride of an N-acylated aminoacid with an alkyl carbonic acid wherein the alkyl group is a lower branched chain alkyl radical.

14. The method of claim 13 wherein the mixed anhydride is a mixed anhydride with secondary butyl carbonic acid.

15. The method of claim 13 wherein the mixed anhydride is a mixed anhydride with isobutyl carbonic acid.

16. A method of preparing amides which comprises reacting together, under anhydrous conditions, a lower alkyl ester of an optically active aminoacid and a mixed anhydride of an optically active N-acylated aminoacid with an alkyl carbonic acid wherein the alkyl group is a lower branched chain alkyl radical.

17. The method of claim 16 wherein said mixed anhydride is an anhydride with a butyl carbonic acid.

References Cited in the file of this patent

Anson et al.: "Advances in Protein Chemistry," vol. V, pp. 21–2 (1949).